(12) United States Patent
Matsumoto et al.

(10) Patent No.: US 6,999,843 B2
(45) Date of Patent: Feb. 14, 2006

(54) NUMERICAL CONTROL APPARATUS AND CAM SYSTEM

(75) Inventors: Ichiro Matsumoto, Numazu (JP); Jun Fujita, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/954,154

(22) Filed: Sep. 18, 2001

(65) Prior Publication Data
US 2002/0055805 A1 May 9, 2002

(30) Foreign Application Priority Data
Sep. 20, 2000 (JP) ............... 2000-284627

(51) Int. Cl.
*G06F 15/46* (2006.01)
(52) U.S. Cl. ............ 700/188; 700/173; 700/175; 700/182; 409/80; 318/571
(58) Field of Classification Search ............ 700/159, 700/175, 176–182, 188, 193, 195, 96, 160, 700/184, 186, 191; 318/571; 409/80
See application file for complete search history.

(56) References Cited

U.S. PATENT DOCUMENTS

| | | | | |
|---|---|---|---|---|
| 5,404,308 A | * | 4/1995 | Kajiyama | 700/188 |
| 5,827,020 A | * | 10/1998 | Fujita et al. | 409/80 |
| 5,923,560 A | * | 7/1999 | Ozaki et al. | 700/175 |
| 6,225,772 B1 | * | 5/2001 | Aizawa et al. | 318/571 |
| 6,266,572 B1 | * | 7/2001 | Yamazaki et al. | 700/96 |
| 6,535,788 B1 | * | 3/2003 | Yoshida et al. | 700/191 |

FOREIGN PATENT DOCUMENTS

JP  9-29584  1/1997

* cited by examiner

*Primary Examiner*—Leo Picard
*Assistant Examiner*—Douglas S. Lee
(74) *Attorney, Agent, or Firm*—Pillsbury Winthrop Shaw Pittman LLP

(57) ABSTRACT

Upon analyzing a processing program (5) in an analyzer (11, 31), a numerical control apparatus extracts information about a contact position between a tool and a workpiece, and based on the information, it calculates a main spindle revolution instruction value in a main spindle revolution calculator (14, 38). In a CAM system, information about the contact position between the tool and the workpiece to be supplied to the numerical control apparatus is calculated and added to the processing program.

6 Claims, 4 Drawing Sheets

① INCLINATION OF PLANE PARALLEL TO MOVING DIRECTION

● ACTUAL CONTACT POSITION
○ CONTACT POSITION BY PROGRAM INSTRUCTION

② DIFFERENCE IN CONTACT POSITION DEPENDING ON TOOL

● CONTACT POSITION OF BULL NOSE
○ CONTACT POSITION OF BALL END MILL

NUMERICAL CONTROL APPARATUS AND CAM SYSTEM

BACKGROUND OF THE INVENTION

1. Field of the Invention

This invention relates to a processing system suitable for accurately processing a free-form surface at a high speed, and more particularly, to a numerical control apparatus for controlling a main spindle revolution on instructions of a processing program and a CAM system for adding tool contact positional information to a processing program.

2. Description of Related Art

In a numerical control apparatus suitable for accurately processing a free-form surface at a high speed, the moving path of a tool is instructed by a processing program, and the moving speed of the tool along the path is also instructed by marking an F code in the processing program. However, if the tool is moved at a speed instructed by the F code, the system may fail to maintain the processing accuracy due to error factors such as a delay of a servo system.

As a measure of preventing such disadvantages, some of recent NC apparatuses for high-speed, high-accuracy processing of free-form surfaces are configured to estimate the form of the instructed path, find the acceptable maximum speed for maintaining the processing accuracy within an acceptable error range depending upon the estimated form, and automatically limit the speed within the acceptable maximum speed regardless of the speed instructed by the F code.

Although the revolution of the main spindle is instructed by an S code in the program, there is an optimum combination between the revolution of the main spindle and the feeding speed of the main spindle depending on the cutting conditions. However, in case a system has the above-mentioned function of automatically controlling the feeding speed in accordance with the form, if these values are instructed by the F code and the S code of the program, the speed value is limited, and even though the revolution of the main spindle is constant, the speed may become far from the value instructed by the F code.

In cutting, it is generally considered to be a desirable cutting condition that the feeding amount of each blade is constant and the cutting speed, i.e. the relative tangential speed of the contact points between the tool and the workpiece, is contact.

Under that condition, the real cutting speed will be stabilized and the lifetime of the tool will be elongated, wear of the tool will be alleviated, and a stable feeding speed of each blade will be obtained. As a result, the processed surface will be improved in quality, and reduction of the processing time by improvement of the feeding speed can be expected.

Under the circumstances, the Inventors proposed a numerical control apparatus disclosed in Japanese Patent Application No. hei 7-175277 (Japanese Patent Laid-Open Publication No. hei 9-29584), which can maintain the optimum condition for combination of revolution and feeding speed of the main spindle determined by the cutting condition when cutting a free-form surface, alleviates the tool wear, and ensures high-speed, high-accuracy processing.

That is, this numerical control apparatus controls a predetermined cutting speed in peripheral velocity, depending on the contact diameter of the tool, which changes in accordance with the curved surface from time to time, to synchronize the rotation and the feeding speed. More specifically, revolution of the main spindle is changed by a main spindle revolution control means in response to a feeding speed obtained by a feeding speed determining means based on a moving form of a tool instructed by a processing program; the main spindle revolution based on a change of the contact position between the tool and the workpiece in accordance with the moving direction of the main spindle is additionally changed by the main spindle revolution control means, and the main spindle revolution is further changed by the main spindle revolution control means based on a feeding speed containing information about the main spindle moving direction obtained by the feeding speed determining means in accordance with the moving form of the tool.

However, since this function computes the contact position between the tool and the workpiece based on the moving direction of the tool instructed by the processing program, it cannot cope with changes of the contact position in particular cases.

For example, FIG. 4 shows that a ball end mill 1 is working an inclined plane 2 parallel to the moving direction of the tool while moving vertically to the drawing sheet plane. In this case, there is a deviation between the contact position designated by the program instruction, which is shown by the white point, and the actual contact position, which is shown by the black point.

FIG. 5 shows that a difference is produced in contact position depending on tools. The white circle shows that in case of a ball end mill 3 whereas the full circle shows that in case of a bull nose 4.

To overcome this problem, the processing program may instruct such a main spindle revolution that CAM maintains the optimum condition of combination of the main spindle revolution and feeding amount that are determined by the cutting condition. However, since the optimum condition of combination of the main spindle revolution and the feeding speed changes variously depending on stiffness of the tool and the workpiece, number of blades of the tool, and so on, in case CAM instructs the main spindle revolution by way of the processing program, it is annoying that the processing program itself has to be re-output every time when the optimum condition changes.

SUMMARY OF THE INVENTION

It is therefore an object of the invention to provide a numerical control apparatus capable of reliably obtaining an optimum main spindle revolution even under special relations of a tool and a workpiece, thereby alleviating wear of the tool and ensuring high-speed, high-accuracy processing, and a CAM system that can give appropriate information to the numerical control apparatus.

In the present invention, since information about the contact position between the tool and the workpiece is computed by the CAM system and added to the processing program, and the numerical control apparatus uses the information about the contact position contained in the processing program to control the revolution of the main spindle. Therefore, even under special positional relations between the tool and the workpiece, such as the moving direction of the tool being parallel to the inclined surface of the workpiece, it is ensured to obtain an optimum main spindle revolution, alleviate wearing of the tool, and realize high-speed, high-accuracy processing.

DESCRIPTION OF THE PREFERRED EMBODIMENTS

Embodiments of the invention will now be explained below with reference to the drawings.

Figure 1:
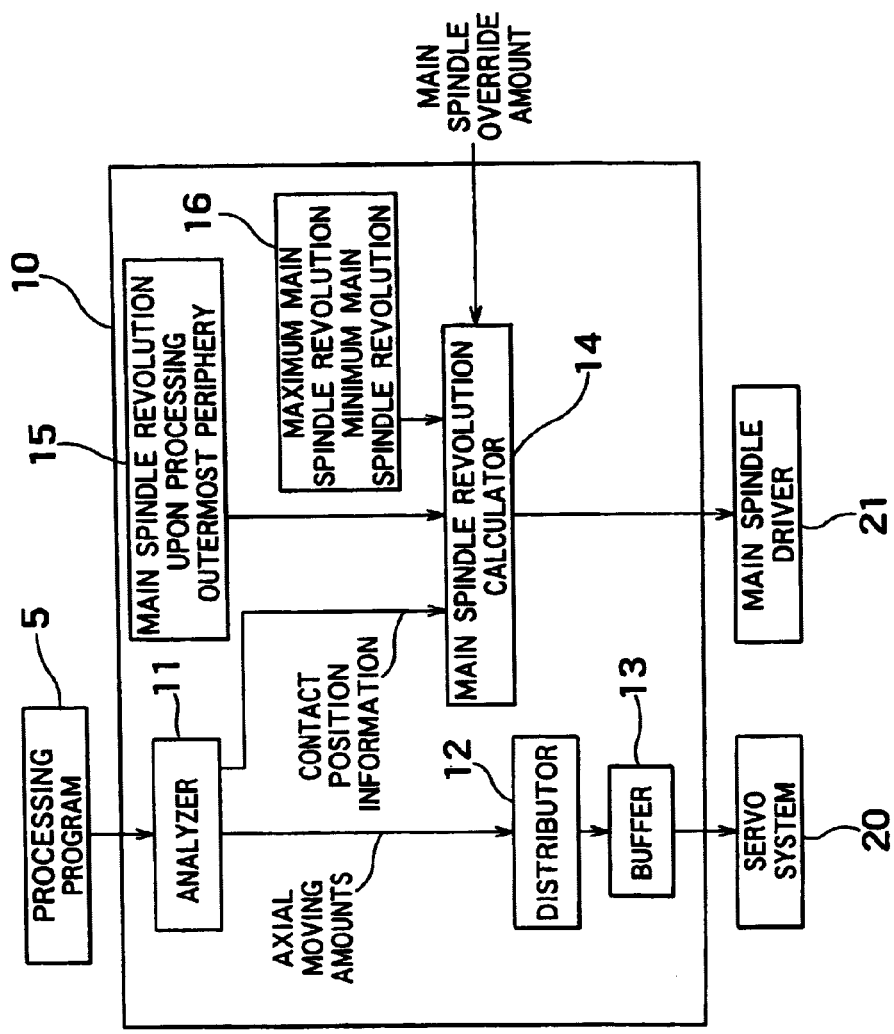
FIG. 1 is a block diagram showing the first embodiment of the invention.

FIG. 1 is a block diagram that shows general configuration of a numerical control apparatus 10 according to the first embodiment of the invention. In this embodiment, no instruction value for the main spindle revolution is instructed in the processing program.

The processing program 5 is sent to an analyzer 11 and analyzed there. The analyzer 11 extracts character strings such as X code, S code, G code, M code, and so on, from character strings in the processing program, and finds respective axial moving amounts. These axial moving amounts can be found, for example, as moving amounts along X, Y and Z axes from coordinates of start and terminal positions of processing. These amounts are found for each block.

Moving amount on each axis are converted by a distributor 12 to a movement instruction of each axis, and sent to a servo system of each axis via a buffer 13.

On the other hand, the analyzer 11 outputs information about a contact position as well.

Figure 2:
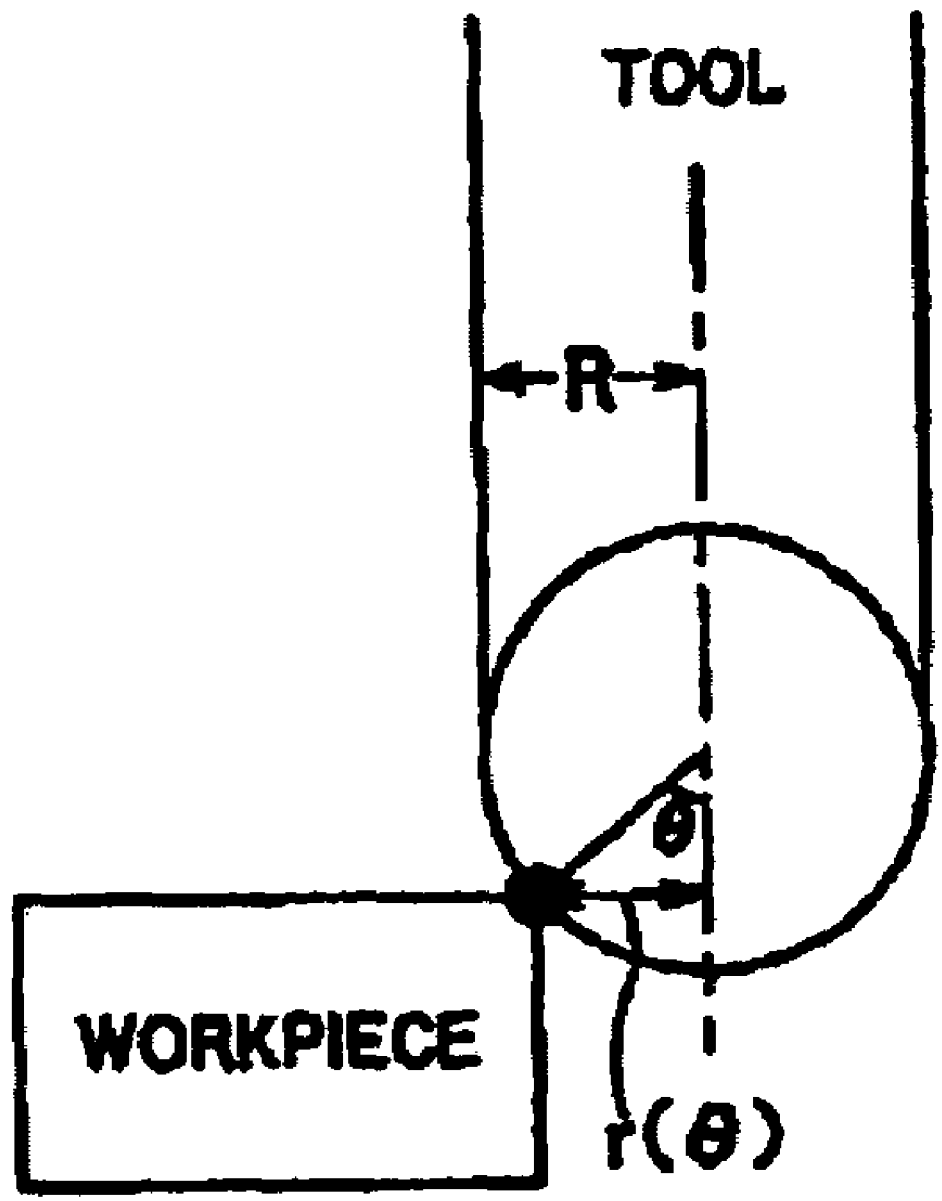
FIG. 2 is an explanatory diagram that shows a method of computing information about a tool contact position in the invention.

FIG. 2 is an explanatory diagram that shows a method of computing the contact position information.

The contact position information (L) is computed in terms of magnification between the distance $r(\theta)$ from the contact point between the tool and the workpiece to the center of the tool and the radius R of the tool in the following manner.

$L$=Magnification=(tool radius $R$)/(distance $r(\theta)$ from contact point to tool center)

When this equation is used, it is possible that magnification increases infinitely in calculated value, for example, in case of processing of a tip portion of the tool. Therefore, maximum value of magnification is determined to limit it. In case the tool and the workpiece contact at two points, means are prepared to determine with parameters which of larger and smaller magnifications is selected.

CAM adds the calculated contact position information (L) to the processing program for each block. An example thereof is shown below.

| N001 | G01 | X100. | Y100. | L1.0 |
|------|-----|-------|-------|------|
| N002 |     | X200. | L2.0  |      |
| N003 |     | Y200. | L100.0 |     |

Returning back to FIG. 1, the contact position information found in the analyzer is given to the main spindle revolution calculator 14.

The main spindle revolution calculator 14 is also supplied with the main spindle revolution for processing the outermost periphery, which is stored in the main spindle revolution storage portion 15 upon processing the outermost periphery, maximum and minimum revolutions of the main spindle stored in the maximum/minimum main spindle revolution storage portion 16, and main spindle override amount, and the main spindle revolution instruction value S is obtained from these data. The instruction value S is output to the main spindle driver 21.

The main spindle revolution in the NC apparatus is calculated by, for example, the following manner.

Based on the contact position information given by the processing program for each moving block and the main spindle revolution for the outermost periphery processing set by the NC apparatus, the main spindle revolution at the contact position in question is computed using the following equation.

Main spindle revolution of the block in question=(main spindle revolution for the outermost periphery processing)×(magnification in that block)

In case of any change of conditions such as materials of the tool and the workpiece, number of blades of the tool, or the like, it can be coped with by changing the main spindle revolution of the outermost periphery processing.

Since this embodiment calculates the main spindle revolution based on positional information of contact between the tool and the workpiece, it ensures high-speed, high-accuracy processing even when they exhibit a special positional relation.

Figure 3:
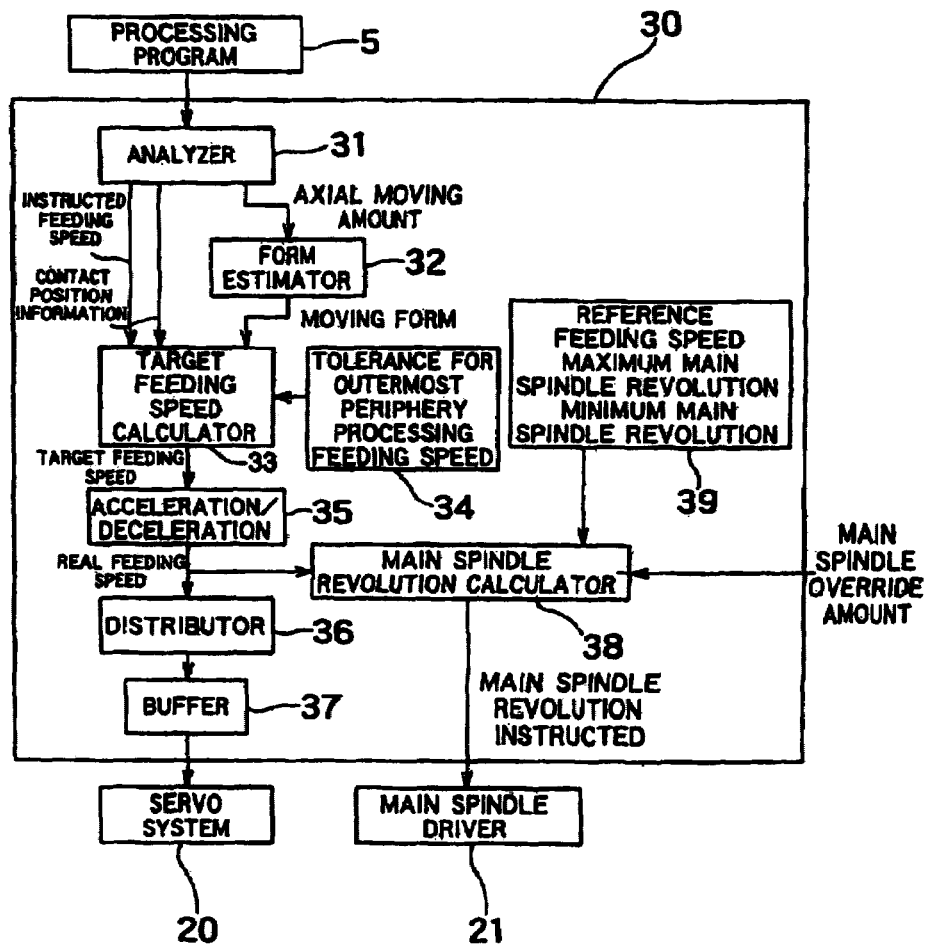
FIG. 3 is a block diagram that shows the second embodiment of the invention.
Figure 4:
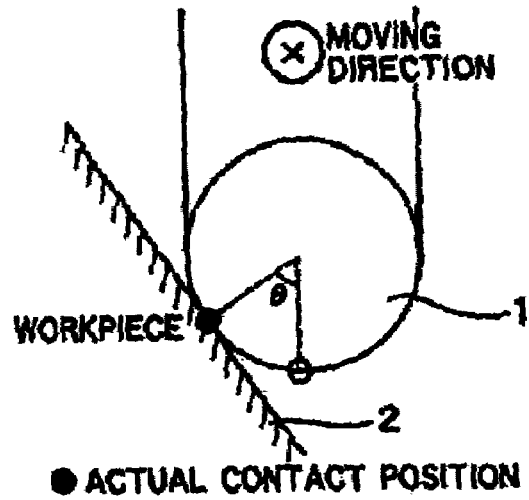
FIG. 4 is an explanatory diagram that shows one of problems involved in a conventional proposal.
Figure 5:
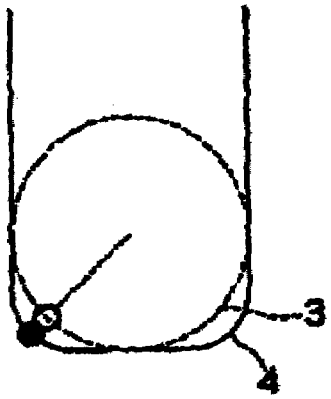
FIG. 5 is an explanatory diagram that shows another problem involved in the conventional proposal.

FIG. 3 is a block diagram that shows general configuration of a numerical control apparatus 30 according to the second embodiment of the invention. Here is assumed again that no instructions value for the main spindle revolution is described in the processing program.

The processing program 5 is sent to an analyzer 31 and analyzed there. The analyzer 31 extracts character strings such as X code, S code, G code, M code, and so on, from character strings in the processing program, and finds moving amounts on respective axes. Procedures for finding moving amounts on respective axes are the same as those of the first embodiment.

An instruction feeding speed and information about a contact position obtained by the procedure shown in FIG. 2 as well are output from the analyzer 31, and they are sent to a target feeding speed calculator.

Axial moving amounts are sent to a form estimator 32, and a moving form is found. Decision of the moving form relies on determining whether it is a corner or a curve by analyzing the axial moving amounts over a plurality of blocks. A straight line is recognized as a curve having an infinitely large curvature radius.

In a target feeding speed calculator 33, a target feeding speed is calculated, taking the above-mentioned instruction feeding speed into account, cased on the contact position information and the moving form obtained by the form estimator. In this case, although priority is given to the feeding speed in accordance with the moving form, a first target feeding speed Fe is output only after a provisionally employed feeding speed is examined and checked whether it, if used to process a workpiece, ensures a processing accuracy falling within the error margin stored in a feeding speed tolerance storage portion 34 for storing the feeding speed tolerance upon processing the outermost periphery and after it is modified to a condition ensuring an accuracy within the error margin.

For the purpose of uniforming the cutting speed, the second target feeding speed Fc is found by evaluation by moving directions. This may be found in the following manner, for example.

In case of a ball end mill, the main spindle revolution S is determined as $$S=(60/2\pi)(V/r(\theta)) \quad \text{(rpm)}$$

Therefore, by multiplying it by the coefficient K (mm/rev) for conversion to a corresponding feeding speed, the target feeding speed Fc for uniforming the cutting speed is obtained as $$Fc=K \pm S \quad \text{(mm/min)}$$

Smaller one of Fc and Fe is employed as the target feeding speed at that point of time, and it is output from the target feeding speed calculator 33.

The target feeding speed is determined individually for each block. However, since the speed may largely change at each changing point from one block to another, acceleration or deceleration is conducted in an acceleration/deceleration processor 35 to make a smooth continuous change in speed from one block to another, that is, to make a real feeding speed.

The real feeding speed is converted to movement instructions along respective axes by a distributor 36, and they are sent to servo systems 20 of respective axes.

The real feeding speed is given to a main spindle rotation calculator 38 as well. The main spindle revolution calculator 38 is supplied with a reference feeding speed, maximum main spindle revolution and minimum main spindle revolution, which are stored as reference values in storage portion 39, are extracted and input, and the main spindle override amount, and it calculates the main spindle revolution instruction value Sx from those data and then outputs it.

For calculating the main spindle revolution, based on $$Fx = \text{real feeding speed/reference feeding speed}$$

the following can be obtained.

$$Sx = \text{instructed revolution} * Fx * \text{main spindle override}$$

However, this revolution should lie between the predetermined minimum and maximum revolutions, Sx is determined to satisfy the condition Minimum revolution<Sx≦maximum revolution The main spindle revolution instruction value, thus obtained, is sent to the main spindle driver 21 to control the revolution of the main spindle.

According to the embodiment, since the main spindle revolution is calculated based in accordance with information about a contact position between the tool and the workpiece, taking account of the form of axial movements, high-speed, high-accuracy processing is ensured even under a special positional relation between the tool and the workpiece.

As described above, according to the invention, since the information about a contact position of the tool is used for calculating the main spindle revolution, processing can be conducted under substantially optimum cutting conditions, even in case of special positional relations, such as processing of a plane inclined in parallel with the tool running direction, processing with a tool having a different form, or the like, which have not been coped with by the conventional technique.

In addition, even upon a change of condition of materials of the tool and the workpiece, number of blades of the tool, and so on, it can be dealt with by changing the main spindle revolution for processing of the outermost periphery without changing the processing program.

What is claimed is:

1. A numerical control apparatus for controlling a machine tool used to process a formed surface, comprising: main spindle revolution control means for controlling a main spindle in revolution based on contact position information about a contact position between a tool and a workpiece instructed by a processing program, wherein said main spindle revolution control means includes:
    an analyzer for obtaining the contact position information instructed by the processing program; and
    a main spindle revolution calculator responsive to said contact position information for calculating revolution of the main spindle corresponding to the contact position between the tool and the workpiece.

2. A numerical control apparatus according to claim 1, wherein the main spindle revolution is calculated from $$S=(60/2\pi)*(V/R) * L$$

where R (mm) is the radius of the outermost periphery of a tool used as the processing tool, V (mm/sec) is a desired tangential speed at the processing point of the tool, which is given by said main spindle revolution calculator), L is the contact position information, and S (rpm) is the main spindle revolution.

3. A numerical control apparatus according to claim 1, wherein said main spindle revolution control means includes a limitation means for adding limitation to the calculated main spindle revolution by giving maximum and minimum values.

4. A numerical control apparatus for controlling a machine tool used to process a formed surface, comprising: feeding speed determining means for determining a feeding speed on the basis of a moving form of a tool axis instructed by a processing program; and main spindle revolution control means for controlling a main spindle in revolution on the basis of said feeding speed and contact position information about a contact position between a tool and a workpiece instructed by said processing program, wherein said main spindle revolution control means includes:
    an analyzer for obtaining the contact position information instructed by the processing program; and
    a main spindle revolution calculator responsive to said contact position information for calculating revolution of the main spindle corresponding to the contact position between the tool and the workpiece.

5. A numerical control apparatus according to claim 4, wherein the main spindle revolution is calculated from $$S=(60/2\pi)*(V/R) *L$$

where R (mm) is the radius of the outermost periphery of a tool used as the processing tool, V (mm/sec) is a desired tangential speed at the processing point of the tool, which is given by said main spindle revolution calculator), L is the contact position information, and s (rpm) is the main spindle revolution.

6. A numerical control apparatus according to claim 4, wherein said main spindle revolution control means includes a limitation means for adding limitation to the calculated main spindle revolution by giving maximum and minimum values.

* * * * *